(12) United States Patent
Venkataraman et al.

(10) Patent No.: US 7,524,572 B2
(45) Date of Patent: Apr. 28, 2009

(54) FUEL CELL SYSTEM WITH THERMALLY INTEGRATED COMBUSTOR AND CORRUGATED FOIL REFORMER

(75) Inventors: Swaminathan Venkataraman, Cupertino, CA (US); William David Lyle, San Francisco, CA (US); Martin Perry, Sunnyvale, CA (US); William Whittenberger, Leavittsburg, OH (US)

(73) Assignee: Bloom Energy Corporation, Sunnyvale, CA (US)

( * ) Notice: Subject to any disclaimer, the term of this patent is extended or adjusted under 35 U.S.C. 154(b) by 743 days.

(21) Appl. No.: 11/100,489

(22) Filed: Apr. 7, 2005

(65) Prior Publication Data
US 2006/0228598 A1 Oct. 12, 2006

(51) Int. Cl.
H01M 8/06 (2006.01)
H01M 8/08 (2006.01)
(52) U.S. Cl. .......................................... 429/26; 429/20
(58) Field of Classification Search .................. 429/26, 429/20
See application file for complete search history.

(56) References Cited

U.S. PATENT DOCUMENTS

| | | | |
|---|---|---|---|
| 3,488,266 A | 1/1970 | French | |
| 3,718,506 A | 2/1973 | Fischer et al. | |
| 4,041,210 A | 8/1977 | Van Dine | |
| 4,182,795 A | 1/1980 | Baker et al. | |
| 4,532,192 A | 7/1985 | Baker et al. | |
| 4,792,502 A | 12/1988 | Trocciola et al. | |
| 4,898,792 A | 2/1990 | Singh et al. | |
| 4,917,971 A | 4/1990 | Farooque | |
| 4,983,471 A | 1/1991 | Reichner et al. | |
| 5,034,287 A | 7/1991 | Kunz | |
| 5,047,299 A | 9/1991 | Shockling | |
| 5,079,105 A | 1/1992 | Bossel | |
| 5,084,362 A | 1/1992 | Farooque | |
| 5,143,800 A | 9/1992 | George et al. | |
| 5,169,730 A | 12/1992 | Reichner et al. | |
| 5,170,124 A | 12/1992 | Blair et al. | |
| 5,302,470 A | 4/1994 | Okada et al. | |
| 5,366,819 A | 11/1994 | Hartvigsen et al. | |
| 5,441,821 A | 8/1995 | Merritt et al. | |
| 5,498,487 A | 3/1996 | Ruka et al. | |
| 5,501,914 A | 3/1996 | Satake et al. | |

(Continued)

FOREIGN PATENT DOCUMENTS

EP 0 398 111 A1 11/1990

(Continued)

OTHER PUBLICATIONS

U.S. Appl. No. 11/002,681, filed Dec. 3, 2004.

(Continued)

Primary Examiner—Gregg Cantelmo
(74) Attorney, Agent, or Firm—Foley & Lardner LLP

(57) ABSTRACT

A fuel cell system includes a fuel cell stack, a reformer which is thermally integrated with the fuel cell stack. The system may also include a combustor which is thermally integrated with the reformer. The reformer is a reformation catalyst containing channel bounded by at least one corrugated foil wall. The reformer is adapted to reform a hydrocarbon fuel to a hydrogen containing reaction product and to provide the reaction product to the fuel cell stack.

9 Claims, 2 Drawing Sheets

U.S. PATENT DOCUMENTS

| | | | |
|---|---|---|---|
| 5,505,824 A | 4/1996 | McElroy | |
| 5,527,631 A | 6/1996 | Singh et al. | |
| 5,573,867 A | 11/1996 | Zafred et al. | |
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,763,114 A | 6/1998 | Khandkar et al. | |
| 5,955,039 A | 9/1999 | Dowdy | |
| 6,013,385 A | 1/2000 | DuBose | |
| 6,051,125 A | 4/2000 | Pham et al. | |
| 6,280,865 B1 | 8/2001 | Eisman et al. | |
| 6,329,090 B1 | 12/2001 | McElroy et al. | |
| 6,348,278 B1 | 2/2002 | LaPierre et al. | |
| 6,403,245 B1 | 6/2002 | Hunt | |
| 6,436,562 B1 | 8/2002 | DuBose | |
| 6,451,466 B1 | 9/2002 | Grasso et al. | |
| 6,531,243 B2 | 3/2003 | Thom | |
| 6,623,880 B1 | 9/2003 | Geisbrecht et al. | |
| 6,749,958 B2 | 6/2004 | Pastula et al. | |
| 6,821,663 B2 | 11/2004 | McElroy et al. | |
| 2001/0049035 A1 | 12/2001 | Haltiner, Jr. et al. | |
| 2002/0004154 A1 | 1/2002 | Pastula et al. | |
| 2002/0028362 A1 | 3/2002 | Prediger et al. | |
| 2002/0058175 A1 | 5/2002 | Ruhl | |
| 2002/0106544 A1 | 8/2002 | Noetzel et al. | |
| 2003/0157386 A1 | 8/2003 | Gottmann | |
| 2003/0162067 A1 | 8/2003 | McElroy | |
| 2003/0196893 A1 | 10/2003 | McElroy | |
| 2003/0205641 A1 | 11/2003 | McElroy | |
| 2004/0191597 A1 | 9/2004 | McElroy | |
| 2004/0202914 A1 | 10/2004 | Sridhar et al. | |
| 2004/0224193 A1 | 11/2004 | Mitlitsky et al. | |
| 2005/0048334 A1 | 3/2005 | Sridhar et al. | |
| 2005/0164051 A1 | 7/2005 | Venkataraman | |
| 2006/0147771 A1* | 7/2006 | Russell et al. | 429/24 |

FOREIGN PATENT DOCUMENTS

| | | |
|---|---|---|
| EP | 0 977 294 B1 | 2/2000 |
| WO | WO 94/18712 | 8/1994 |
| WO | WO 2004/013258 A1 | 2/2004 |

OTHER PUBLICATIONS

U.S. Appl. No. 11/028,506, filed Jan. 4, 2005.

* cited by examiner

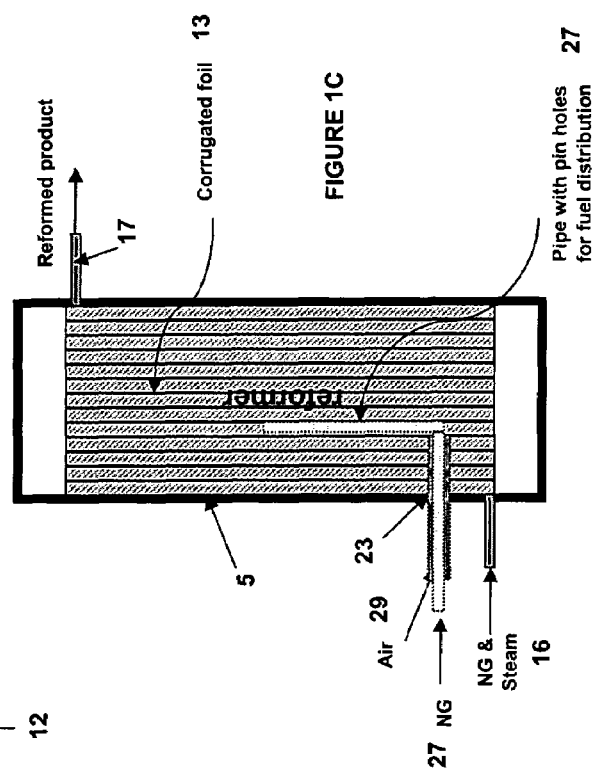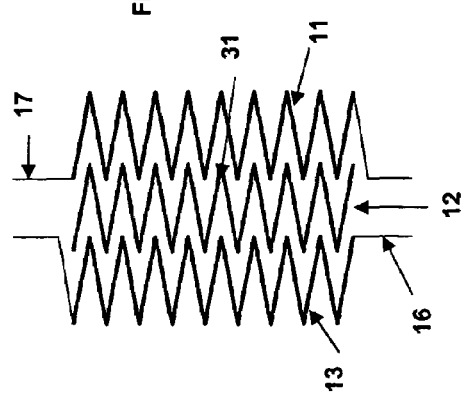

FUEL CELL SYSTEM WITH THERMALLY INTEGRATED COMBUSTOR AND CORRUGATED FOIL REFORMER

BACKGROUND OF THE INVENTION

The present invention is generally directed to fuel cells and more specifically to fuel cell systems and their operation.

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

In a high temperature fuel cell system such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

BRIEF SUMMARY OF THE INVENTION

One aspect of present invention provides a fuel cell system which comprises a fuel cell stack, a reformer which is thermally integrated with the fuel cell stack, and preferably a combustor which is thermally integrated with the reformer. The reformer comprises a reformation catalyst containing channel bounded by at least one corrugated foil wall. The reformer is adapted to reform a hydrocarbon fuel to a hydrogen containing reaction product and to provide the reaction product to the fuel cell stack.

BRIEF DESCRIPTION OF THE DRAWINGS

FIGS. 1A, 1B and 1C are schematic top, side and front cross sectional views, respectively, of a system of the first, third and fourth embodiments of the present invention.

FIG. 1D is a schematic top cross sectional view of a reformer of the second embodiment of the present invention.

DETAILED DESCRIPTION OF THE PREFERRED EMBODIMENTS

Figure 1B:
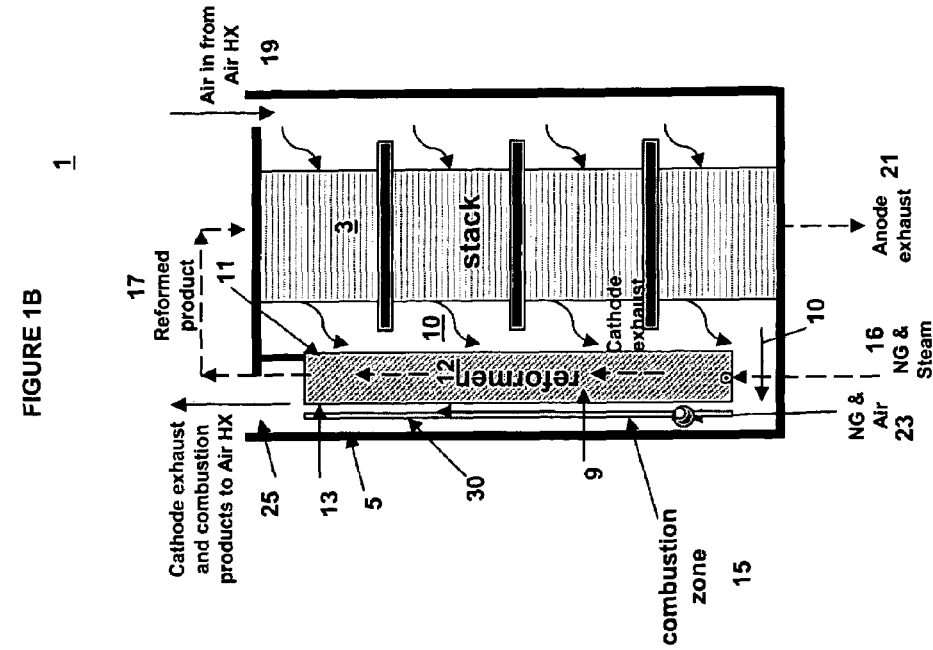

The present inventors have realized that in a system of one embodiment of the invention containing a thermally integrated fuel cell stack, reformer and preferably a combustor, the heat transfer among these components may be improved when one or more reformer walls comprise corrugated foils. The reformer comprises a reformation catalyst containing channel between the corrugated foil walls.

Preferably, the reformer is located between the fuel cell stack and the combustor. A first wall between the fuel cell stack and the reformer comprises the first corrugated foil and a second wall between the combustor and the reformer comprises the second corrugated foil.

In the first embodiment, the reformer sides of the first and second corrugated foils are coated with reformation catalyst. The side of the first corrugated foil facing the fuel cell stack receives heat from the stack by both convection and radiation. The corrugation and low thickness of the first foil enables high convective and radiation heat transfer from the stack to the reformer. Preferably, the cathode exhaust of the fuel cell stack is adapted to heat the reformer. In this case, the first corrugated foil separates the reformer from a cathode (i.e., air) exhaust manifold of the fuel cell stack.

The side of the second corrugated foil facing the combustor is preferably coated with a combustion catalyst. The corrugation and low thickness of the second foil foils increases the heat transfer and heat transfer area between the reformer and the combustor.

The thermal integration of the reformer and the combustor to the stack allows thermal balance for a wide variety of operating conditions without losing efficiency. The convective and radiative coupling of stack and reformer produces a synergy where waste heat from stack is effectively used for reformation, thus increasing the overall balance of plant efficiency. Individual fuel control to combustor may be used to avoid thermal imbalance or runaway.

In a second embodiment of the invention, an independent or third foil coated with reformation catalyst is provided into the reformer channel between the walls of the reformer. In the second embodiment, the reformer may comprise corrugated foil walls of the first embodiment or non-corrugated and/or thick walls. The walls of the reformer of the second embodiment may be coated or uncoated with the reformation catalyst. The third foil increases the amount of hydrocarbon fuel reformation in the reformer.

The combustor includes a combustor chamber (i.e., the combustion zone) containing a combustion catalyst, a combustor fuel inlet conduit adapted to provide a fuel into the combustor chamber, and a combustor oxidizer inlet conduit adapted to provide an oxidizer into the combustor chamber.

In a third embodiment of the invention, the oxidizer inlet conduit comprises an oxidizer pipe formed as an annulus around the combustor fuel inlet conduit, at least outside the combustor chamber. Thus, the fuel to the combustor is sent through a pipe that is at the center of two concentric pipes. While the inner pipe (i.e., the fuel inlet conduit) carries the fuel, the outer pipe (i.e., the oxidizer inlet conduit) carries an oxidizer, such as external air. The cool air sent through the outer pipe of the concentric pipes helps in cooling the fuel in the inner pipe to avoid coking. Furthermore, it helps the combustion when the cool air and fuel mix at the outlet of the inlet conduits before mixing with hot cathode exhaust (i.e., air) which may also be provided into the combustor. The cathode exhaust combined with combustion products supply the heat for reformation in the reformer.

In a fourth embodiment of the invention, the fuel inlet conduit comprises a pipe extending substantially vertically through the combustor chamber and containing pinholes for improved fuel distribution in the combustor chamber. If desired, an optional a wire mesh (i.e., wire gauze) may be provided in the combustor chamber to further improve fuel distribution in the combustor chamber. It should be noted that the features of the first, second, third and/or fourth embodiments may be used together in any combination or separately.

Figure 1A:
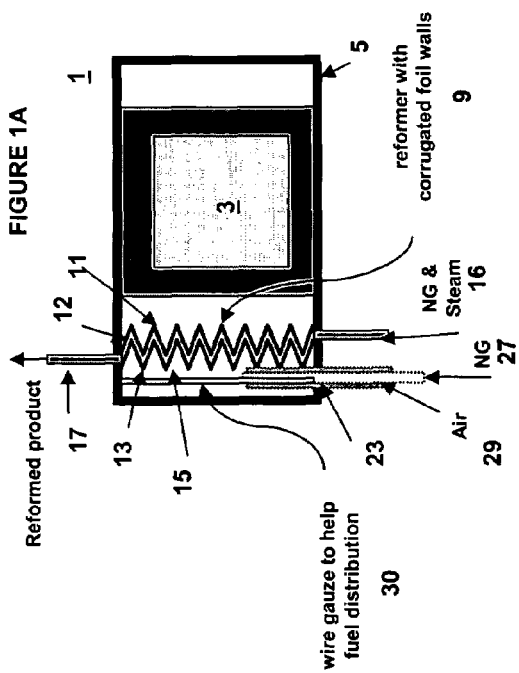

FIGS. 1A, 1B and 1C illustrate a fuel cell system 1 according to embodiments of the invention. Preferably, the system 1 is a high temperature fuel cell stack system, such as a solid oxide fuel cell (SOFC) system or a molten carbonate fuel cell system. However, the system 1 may also comprise other fuel cell systems that utilize a reformer. The system 1 may be a regenerative system, such as a solid oxide regenerative fuel cell (SORFC) system which operates in both fuel cell (i.e., discharge) and electrolysis (i.e., charge) modes or it may be a non-regenerative system which only operates in the fuel cell mode.

The system 1 contains a high temperature fuel cell stack 3. The stack 3 may contain a plurality of SOFCs, SORFCs or molten carbonate fuel cells. Each fuel cell contains an electrolyte, an anode electrode on one side of the electrolyte in an anode chamber, a cathode electrode on the other side of the electrolyte in a cathode chamber, as well as other components, such as separator plates/electrical contacts, seals, fuel cell housing and insulation. In a SOFC operating in the fuel cell mode, the oxidizer, such as air or oxygen gas, enters the cathode chamber, while the fuel, such as hydrogen and/or hydrocarbon fuel, enters the anode chamber. Any suitable fuel cell designs and component materials may be used.

The system 1 also contains a reformer 9 and a combustor 15. The fuel cell stack 3, the combustor 15 and the reformer 9 are located in the same manifold housing 5 with the reformer preferably being sandwiched between the stack 3 and the combustor 15. The manifold housing 5 may comprise any suitable enclosure which houses the stack 3, reformer 9 and combustor 15 as well as the fuel and air manifolds which provide fuel and air into the stack 3. Preferably, the housing 5 is made of or contains a thermally insulating material to keep a substantial amount of heat from the stack 3 and combustor 15 from radiating out of the housing 5. In this case, the housing 5 acts as a hot box. Preferably, the manifold housing 5 that supports the combustor and the reformer is snapped on to the exterior of the stack making sure that the connection is sealed well.

The reformer 9 is adapted to reform a hydrocarbon fuel to a hydrogen containing reaction product and to provide the reaction product to the fuel cell stack 3. The combustor 15 is thermally integrated with the reformer 9 to provide heat to the reformer 9. The term "thermally integrated" in this context means that the heat from the reaction in the combustor 15 drives the net endothermic fuel reformation in the reformer 9.

The reformer 9 preferably comprises a channel 12 located between two corrugated foil walls 11 and 13. Preferably, the reformer 9 comprises a narrow channel 12 between the first foil wall 11 and the second foil wall 13 having a width of 1 mm or less, such as 0.1 to 1 mm. In the narrow reformer channel 12 between the corrugations, the hydrocarbon fuel makes a zig-zag path through the reformer channel, increasing the residence time for reformation reaction. In other words, a straight line path preferably does not exist from the fuel inlet 16 to the fuel outlet 17 through the channel 12 between the walls 11, 13 in the reformer 9.

In the first embodiment, the corrugated foil walls 11 and 13 preferably comprise thin walls made of a thermally conductive material and having "S" shaped corrugations folded along the horizontal direction. However, corrugations having other shapes and/or other corrugation directions may also be used. For example, the walls 11, 13 are preferably made of any suitable metal and are made sufficiently thin to allow thermal transfer through the walls. For example, the walls 11, 13 may be made of a nickel-based superalloy, such as Inconel 600, 601 or 625, Hastelloy-X, or Haynes 230. An exemplary wall thickness range is 0.004 inches to 0.010 inches, preferably 0.007 inches. The walls 11, 13 are preferably brazed or otherwise attached to the walls of the manifold housing 5. As discussed above, the first wall 11 is a common wall between the stack 3, such as the stack cathode exhaust conduit or manifold 10, and the reformer 9. The second wall 13 is preferably a common wall between the reformer 9 and the combustor 15. Thus, the combustor chamber 15 is preferably bounded by the second wall 13 and the walls of the housing 5. However, if desired, the reformer may contain only one corrugated foil wall 11 or 13 with the other wall being a thick and/or a non-corrugated wall.

The reformer 9 is operatively connected to stack 3 anode inlet via a conduit 17 to provide a reformed product or fuel into the stack 3. Air is provided into the stack 3 through a cathode inlet 19. Humidified fuel is provided into the reformer through a fuel inlet conduit 16 and anode (i.e., fuel) exhaust is exhaust from the stack through fuel outlet conduit 21.

The term "operatively connected" means that components which are operatively connected may be directly or indirectly connected to each other. For example, two components may be directly connected to each other by a fluid (i.e., gas and/or liquid) conduit. Alternatively, two components may be indirectly connected to each other such that a fluid stream passes between the first component to the second component through one or more additional components of the system.

The hydrocarbon fuel reformer 9 is adapted for partially or wholly reforming a hydrocarbon fuel to form a carbon containing and free hydrogen containing fuel. For example, the fuel reformer 9 may reform a hydrocarbon gas into a gas mixture of free hydrogen and a carbon containing gas. For example, the fuel reformer 9 may reform a humidified biogas, such as natural gas, to form free hydrogen, carbon monoxide, carbon dioxide, water vapor and optionally a residual amount of unreformed biogas by a steam methane reformation (SMR) reaction. The free hydrogen and carbon monoxide are then provided into the fuel inlet of the fuel cell stack 3 which is operatively connected to the reformer 9 via conduit 17.

Preferably, the reformer 9 is thermally integrated with the stack 3 to support the endothermic reaction in the reformer 9 and to cool the stack 3. The term "thermally integrated" in this context means that the heat from the reaction in the fuel cell stack 3 drives the net endothermic fuel reformation in the fuel reformer 9. The fuel reformer 9 may be thermally integrated with the fuel cell stack 3 by placing the reformer and stack(s) in the same hot box 5 and/or in thermal contact with each other, and/or by providing a thermal conduit or thermally conductive material which connects the stack(s) to the reformer.

Preferably, the reformer 9 is thermally integrated with the stack 3 by being located adjacent and in thermal contact with each other. Most preferably, the reformer 9 is separated from the stack 3 by a wall comprising a corrugated foil. In other words, the wall may comprise only the foil which may be coated with a catalyst, or the wall may comprise the foil and an additional supporting or other material. As shown in FIGS. 1A and 1B, the reformer is located adjacent (i.e., in close proximity) to the stack 3 to provide radiative and convective heat transfer from the stack 3 to the reformer. Preferably, the cathode exhaust conduit or manifold 10 of the stack 3 is in direct contact with a wall 11 of the reformer 9. For example, the wall 11 comprises a first corrugated foil wall of the reformer 9 and also comprises an outer wall of the cathode exhaust conduit or manifold 10 of the adjacent stack 3. In other words, the space between the stack 3 and the wall 11 of the reformer 9 comprises the upper portion of the stack cathode exhaust conduit 10. Thus, the stack's cathode exhaust provides convective heat transfer from the stack 3 to the adjacent reformer 9 through the foil wall 11.

Furthermore, if desired, the cathode exhaust from the stack 3 may be wrapped around the reformer 9 by proper ducting and then optionally fed to the combustion zone of the combustor 15 adjacent to the reformer 9 in addition to or instead of the oxidizer being provided into the combustor 15. Thus, the stack 3 cathode exhaust is preferably configured such that the cathode exhaust stream contacts the reformer 9 and/or wraps around the reformer 9 to facilitate additional heat transfer. This lowers the combustion heat requirement for SMR.

The combustor 15 provides a supplemental heat to the reformer 9 to carry out the SMR reaction during steady state operation. The combustor 15 may be any suitable burner which is thermally integrated with the reformer 9. The combustor 15 receives the hydrocarbon fuel, such as natural gas, and an oxidizer, such as cool air and/or the stack 3 cathode exhaust stream through inlet 23. The fuel and the oxidizer are combusted in the combustor to generate heat for heating the reformer 9. The exhaust gas escapes at the top of the combustor through outlet 25. The combustor outlet 25 may be operatively connected to a heat exchanger to heat one or more incoming streams provided into the fuel cell stack, if desired. Preferably, the combustor 15 shares a common corrugated foil wall 13 with the reformer. One or more walls of the combustor 15 may be coated with a combustion catalyst.

Preferably, the combustor 15 fuel and oxidizer inlet 23 is located in the lower portion of the combustor 15 and the combustor outlet 25 is located in an upper portion of the combustor. If desired, the cathode exhaust outlet 10 of the fuel cell stack 3 may also be operatively connected to the inlet 23 of the combustor 15 to provide an oxidizer, such as hot air, into the combustor 15. The cathode exhaust combined with combustion products supply the heat for reformation in the reformer.

The fuel, such as any suitable hydrocarbon fuel, is provided to the combustor 15 through a combustor fuel inlet conduit, such as a pipe 27. The oxidizer, such as outside air, is provided to the combustor through a combustor oxidizer inlet conduit, such as a pipe 29.

In a third embodiment of the invention, the oxidizer inlet conduit 29 is formed as an annulus or ring around the combustor fuel inlet conduit 27 at least outside the combustor chamber 15. Thus, pipes 27 and 29 comprise two concentric pipes, with pipe 27 comprising the inner or core pipe and pipe 29 comprising the outer or shell pipe. The concentric pipes 27 and 29 may also extend into the combustor chamber 15 in the concentric configuration as shown in FIGS. 1A and 1C. The cool air sent through the outer pipe 29 of the concentric pipes helps in cooling the fuel to avoid coking. Furthermore, it helps the combustion when the air and fuel mix at the outlet of the pipes 27, 29 before mixing with hot cathode air which may be provided separately into the combustor chamber 15.

In a fourth embodiment of the invention, the fuel inlet pipe 27 is bent upwards inside the combustor chamber 15. Thus, the pipe 27 has an "L" shape, with a horizontal portion outside the combustor chamber 15 and a substantially vertical portion inside the combustor chamber 15. The term "substantially vertical" includes an exactly vertical pipe and a pipe which deviates from the exact vertical direction by 1 to 30 degrees, such as by 1 to 10 degrees, for example. The pipe has several small pin holes to help distribute the fuel through the combustor chamber (i.e., the flow channel or combustion zone of the combustor 15). If desired, an optional a wire mesh (i.e., wire gauze with holes) 30 is located in the combustor chamber 15 to improve fuel distribution in the combustor chamber 15. It should be noted that any other suitable combustor 15 may be used instead of the combustor of the third and fourth embodiments shown in FIGS. 1A-1C and described above.

Preferably, the supplemental heat to the reformer 9 is provided from the combustor 15 which is operating during steady state operation of the reformer (and not just during start-up) and from the cathode (i.e., air) exhaust stream of the stack 3. Preferably, the combustor 15 is used only to supplement the heat requirement when the stack heat alone is not able to sustain the reformer 9 heat requirement. Thus, when no heat is required by the reformer, the combustor unit acts as a heat exchanger. Therefore, the same combustor 15 may be used in both start-up and steady-state operation of the system 1.

The fuel flow to the combustor 15 is controlled to make sure that there is enough heat for the reformation reaction in the reformer 9. The system 1 may also contain a control device, such as a fuel flow control valve, adapted to control an amount of fuel being provided to the combustor to control a temperature of the combustor 15. The control of a temperature of the combustor 15 provides independent control of an amount of heat provided to the thermally integrated reformer 9, which in turn provides an independent control of a temperature of the thermally integrated reformer 9. Furthermore, the independent control of a temperature of the reformer 9 provides independent control of a temperature of the stack 3 which receives the reaction product from the temperature controlled reformer 9. In other words, by controlling the fuel flow to the combustor 15, the temperature of the reformer 9 and stack 3 may also be controlled.

While the reformer 9 is shown in the Figures as being thermally integrated with only one stack 3, the reformer 9 may be integrated with more than one stack. For example, the combustor 15 may comprise a tubular or cylindrical shaped combustor and the reformer 9 may comprise a cylindrical ring shaped reformer which surrounds the combustor 15 (i.e., the combustor 15 comprises a core of a ring shaped reformer 9 shell). Alternatively, the reformer may comprise a cylindrical reformer with the combustor located in a different location than the core of the reformer cylinder. It should be noted that in this configuration, the cylindrical reformer would only have one instead of two walls if the upper and lower planes of the cylinder constitute the inlet and outlet of the reformer. In the cylindrical and other similar reformer configurations, more than one stack 3, such as two stacks, may be located adjacent to and thermally integrated with the reformer. For example, different stacks may be located on opposite sides of the cylindrical reformer. Alternatively, a second plate shaped reformer 9 may be located adjacent to both sides of the plate shaped combustor 15 shown in FIGS. 1A and 1B. In this configuration, the combustor 15 is thermally integrated with two reformers 9 and each reformer 9 is thermally integrated with a separate stack 3. In case of systems with multiple stacks or modules, the modules can assembled linearly with separate housings 5 containing separate stack/reformer/combustor units. Alternate arrangements are possible with external air manifold where multiple linear arrays are used.

It should be noted that while the reformer 9 is thermally integrated with the stack 3, and is preferably located in the same housing or hot box 5, the reformer 9 comprises a separate vessel from the stack 3 (i.e., external reformer configuration).

FIG. 1D shows a top view of a reformer 109 according to a second embodiment of the invention. As shown in FIG. 1D, an independent or third foil 31 coated with reformation catalyst is provided into the reformer channel 12 between the walls 11, 13 of the reformer. While FIG. 1D shows a reformer with the corrugated foil walls 11, 13 of the first embodiment, the reformer 109 of the second embodiment may contain non-corrugated and/or thick walls. The walls of the reformer of the third embodiment may be coated or uncoated with the reformation catalyst. The third foil 31 increases the amount of hydrocarbon fuel reformation in the reformer.

Preferably, the foil 31 has the same corrugation pattern, such as the "S" shaped pattern, as the corrugated foil walls 11, 13 of the reformer. More preferably, the foil 31 is positioned between the walls 11, 13 such that the hydrocarbon fuel is forced to make a zig-zag path through the reformer from inlet 16 to outlet 17 through the channel 12 between the corrugations of the foils 11, 13 and 31, increasing the residence time for reformation reaction. In other words, a straight line path preferably does not exist from inlet 16 to outlet 17 through the channel 12 between the walls 11, 13 in the reformer 109 due to the shape and positioning of the foil 31, as shown in FIG. 1D. Furthermore, while foil 31 is illustrated in FIG. 1D as being corrugated, it may comprise a non-corrugated foil instead.

A method of operating the system 1 according to the embodiments of the present invention is described with reference to FIGS. 1A, 1B and 1C.

A preheated air inlet stream is provided into the cathode inlet 19 of the stack 3. The air then exits the stack 3 as a cathode exhaust stream and wraps around the reformer 9. The cathode exhaust stream then enters the combustion zone of the combustor 15 through conduit 10.

The system 1 is preferably configured such that the cathode exhaust (i.e., hot air) exits on the same side of the system as the inlet 16 of the reformer 9. For example, as shown in FIG. 1B, since the mass flow of hot cathode exhaust is the maximum at the lower end of the device, it supplies the maximum heat where it is needed, at feed point of the reformer 9 (i.e., the lower portion of the reformer shown in FIGS. 1B and 1C). In other words, the mass flow of the hot air exiting the stack is maximum adjacent to the lower portion of the reformer 9 where the most heat is needed. However, the cathode exhaust and reformer inlet may be provided in other locations.

Desulfurized natural gas or another hydrocarbon fuel is also supplied from the fuel inlet conduit 27 into the combustor 15. Natural gas is injected into the central combustion zone of the combustor 15 where it mixes with the oxidizer, such as outside air and/or hot cathode exhaust. Heat is transferred to the wall 13 of the reformer by convection and/or conduction from the combustion zone of the combustor. The exhaust stream from the combustor 15 then preferably enters a heat exchanger where it exchanges heat with an incoming stream being provided into the stack 3.

On the fuel side, the preheated hydrocarbon fuel inlet stream and steam enter the reformer 9 through an inlet conduit 16 where the fuel is reformed into a reformate (i.e., a hydrogen and carbon containing gas). The reformate then enters the stack 3 anode inlet from the reformer 9 through conduit 17. The stack anode exhaust stream exists the anode outlet 21 of the stack 3 and may be provided to a heat exchanger where it preheats a stream being provided into one or more stacks 3.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

What is claimed is:

1. A fuel cell system, comprising:
a fuel cell stack; and
a reformer which is thermally integrated with the fuel cell stack by being located adjacent to the fuel cell stack;
wherein:
the reformer is adapted to reform a hydrocarbon fuel to a hydrogen containing reaction product and to provide the reaction product to the fuel cell stack; and
the reformer comprises a reformation catalyst coated corrugated foil located in a reformer channel bounded by one or more walls of the reformer such that the hydrocarbon fuel is forced to make a zig-zag path through the reformer channel.

2. The system of claim 1, wherein the reformer channel is separated from the fuel cell stack by a first corrugated foil.

3. The system of claim 2, further comprising a combustor which is thermally integrated with the reformer, wherein the reformer is located between the fuel cell stack and the combustor.

4. The system of claim 3, wherein:
the fuel cell stack comprises a solid oxide fuel cell stack; and
the fuel cell stack, the combustor and the reformer are located in a manifold housing.

5. The system of claim 1, wherein:
the fuel cell stack comprises a solid oxide fuel cell stack; and
the fuel cell stack, the combustor and the reformer are located in a manifold housing.

6. The system of claim 1, wherein the one or more walls of the reformer are not corrugated.

7. The system of claim 1, wherein the one or more walls of the reformer are corrugated.

8. The system of claim 1, wherein a straight line path does not exist from an inlet of the reformer to an outlet of the reformer through the reformer channel.

9. A fuel cell system, comprising:
a fuel cell stack;
a reformer which is thermally integrated with the fuel cell stack by being located adjacent to the fuel cell stack; and
a combustor which is thermally integrated with the reformer;
wherein:
the reformer is located between the fuel cell stack and the combustor;
the reformer is adapted to reform a hydrocarbon fuel to a hydrogen containing reaction product and to provide the reaction product to the fuel cell stack;
the reformer comprises a reformation catalyst containing foil located in a reformer channel bounded by one or more walls of the reformer;
the reformer channel is separated from the fuel cell stack by a first corrugated foil;
a second corrugated foil separates the reformer from the combustor; and
the reformation catalyst containing foil comprises a corrugated foil which is located between the first and the second corrugated foils, such that the hydrocarbon fuel is forced to make a zig-zag path through the reformer channel.

* * * * *